United States Patent
Rao

(10) Patent No.: US 8,467,585 B2
(45) Date of Patent: Jun. 18, 2013

(54) METHODS AND APPARATUS TO ANALYZE COMPUTED TOMOGRAPHY SCAN DATA

(75) Inventor: Deepti H. Rao, Bangalore (IN)

(73) Assignee: Genenal Electric Company, Schnectady, NY (US)

( * ) Notice: Subject to any disclaimer, the term of this patent is extended or adjusted under 35 U.S.C. 154(b) by 390 days.

(21) Appl. No.: 12/976,271

(22) Filed: Dec. 22, 2010

(65) Prior Publication Data

US 2012/0099775 A1  Apr. 26, 2012

(30) Foreign Application Priority Data

Nov. 9, 2010 (IN) .......................... 3328/CHE/2010

(51) Int. Cl.
   *G06K 9/00* (2006.01)

(52) U.S. Cl.
   USPC .............................. 382/128; 128/922; 378/4

(58) Field of Classification Search
   USPC .. 382/100, 128, 129, 130, 131, 132; 128/922; 378/4–27
   See application file for complete search history.

(56) References Cited

U.S. PATENT DOCUMENTS

| 4,483,075 A | 11/1984 | Kundin |
| 5,881,124 A * | 3/1999 | Giger et al. ........................ 378/8 |
| 5,954,053 A * | 9/1999 | Chance et al. ................. 600/310 |
| 6,233,479 B1 | 5/2001 | Haddad et al. |
| 8,019,142 B2 * | 9/2011 | Nowinski et al. .............. 382/131 |
| 8,144,958 B2 * | 3/2012 | Nahm et al. ................... 382/128 |
| 8,277,385 B2 * | 10/2012 | Berka et al. .................... 600/485 |
| 8,369,590 B2 * | 2/2013 | Wang et al. .................... 382/128 |
| 2009/0279762 A1* | 11/2009 | Tsukimoto ..................... 382/131 |
| 2009/0292198 A1* | 11/2009 | Kleiven et al. ................ 600/416 |
| 2010/0183211 A1* | 7/2010 | Meetz et al. ................... 382/131 |

OTHER PUBLICATIONS

Salman, Nassir; "Image Segmentation Based on Watershed and Edge Detection Techniques"; The International Arab Journal of Information Technology, vol. 3, No. 2, Apr. 2006; pp. 104-110.

Yonghong et al.; "A hybrid approach to detection of brain hemorrhage condidates from clinical heat CT scans"; 2006 Sixth International Conference on Fuzzy Systems and Knowledge Discovery; 2009; pp. 361-365.

Liu et al; "Automatic segmentation of intracranial hematoma and volume measurement"; Engineering in Medicine and Biology Society, 2008. EMBS 2008. 30th Annual International Conference of the IEEE; Aug. 20-25, 2008; pp. 1214-1217.

Cheng et al.; "Multiresolution Based Fuzzy C-Means Clustering for Brain Hemorrhage Analysis"; Bioelectromagnetism; Proceedings of the 2nd International Conference on Feb. 15-18, 1998; 1998.

* cited by examiner

*Primary Examiner* — Anand Bhatnagar

(57) ABSTRACT

Methods and apparatus to analyze healthcare images are disclosed. An example method includes performing a threshold procedure and a watershed procedure on data obtained via a scan of a brain to generate a plurality of segments based on blood volumes associated with the segments; generating one or more statistics related to the each of the segments; and integrating the statistics into image data associated with the scan such that a first one of the statistics corresponding a first one of the segments is to be displayed to a user of the image data in response to receiving an input from the user in connection with the first one of the segments.

20 Claims, 9 Drawing Sheets

METHODS AND APPARATUS TO ANALYZE COMPUTED TOMOGRAPHY SCAN DATA

RELATED APPLICATIONS

This application claims the benefit of priority of Indian Patent Application No. 3328/CHE/2010, filed on Nov. 9, 2010, which is hereby incorporated herein by reference in its entirety.

FIELD OF THE DISCLOSURE

This disclosure relates generally to healthcare systems and, more particularly, to methods and apparatus to analyze healthcare images.

BACKGROUND

Healthcare environments, such as hospitals and clinics, typically include information systems (e.g., hospital information systems (HIS), radiology information systems (RIS), storage systems, picture archiving and communication systems (PACS), etc.) to manage clinical information such as, for example, patient medical histories, imaging data, test results, diagnosis information, management information, and/or scheduling information. The information may be centrally stored or divided at a plurality of locations. Healthcare practitioners may desire to access patient information or other information at various points in a healthcare workflow. For example, during surgery, medical personnel may access patient information, such as images of a patient's anatomy, which are stored in a medical information system. Alternatively, medical personnel may enter new information, such as history, diagnostic, or treatment information, into a medical information system during an ongoing medical procedure.

Medical practitioners, such as doctors, surgeons, and other medical professionals, rely on the clinical information stored in such systems to assess the condition of a patient, to provide immediate treatment to a patient in an emergency situation, to diagnose a patient, and/or to provide any other medical treatment or attention.

SUMMARY

An example computer-implemented method includes performing a threshold procedure and a watershed procedure on data obtained via a scan of a brain to generate a plurality of segments based on blood volumes associated with the segments; generating one or more statistics related to the each of the segments; and integrating the statistics into image data associated with the scan such that a first one of the statistics corresponding a first one of the segments is to be displayed to a user of the image data in response to receiving an input from the user in connection with the first one of the segments.

An example tangible computer readable medium has instructions stored thereon that, when executed causes a machine to perform a threshold procedure and a watershed procedure on data obtained via a scan of a brain to generate a plurality of segments based on blood volumes associated with the segments; generate one or more statistics related to the each of the segments; and integrate the statistics into image data associated with the scan such that a first one of the statistics corresponding a first one of the segments is to be displayed to a user of the image data in response to receiving an input from the user in connection with the first one of the segments.

An example apparatus includes an image segmentation module to partition image data associated with a healthcare image into a plurality of segments based on a plurality of blood volume values; and an integrator to associate a plurality of statistic sets related to the blood volume values with each of the segments in the image data such that a first one of the statistic sets is to be displayed as an overlay on a presentation of the healthcare image in response to detecting an event associated with a cursor located at a first one of the segments corresponding to the first statistic set.

DETAILED DESCRIPTION

Figure 1:
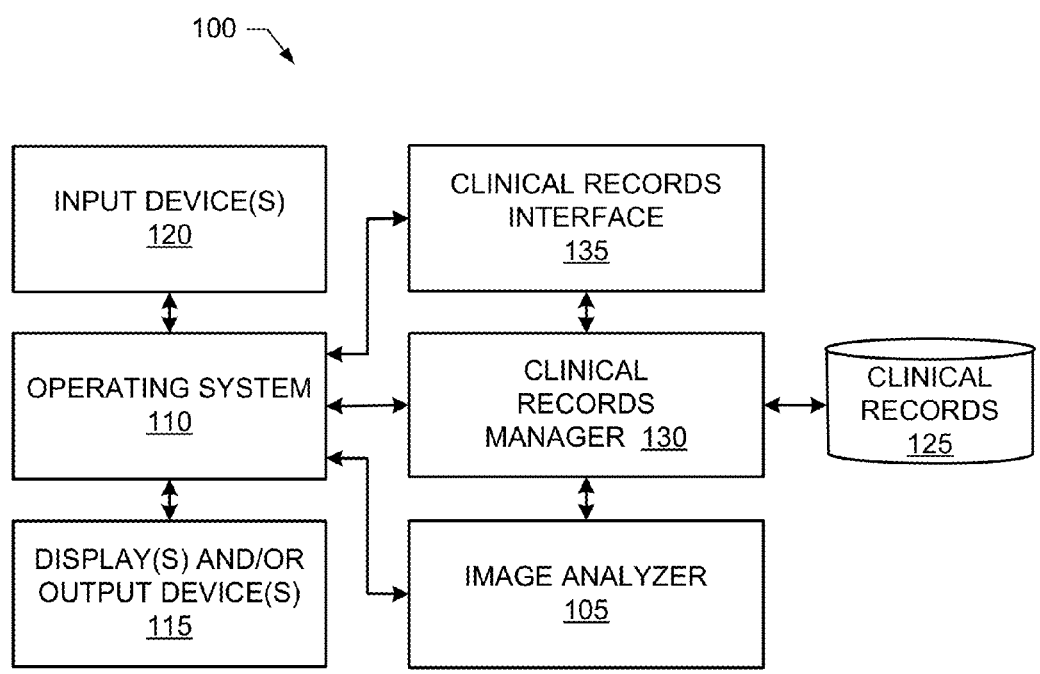
FIG. 1 is a schematic illustration of an example clinical record system within which the example methods, apparatus, systems and articles of manufacture described herein may be implemented.

Although the following discloses example methods, apparatus, systems, and articles of manufacture including, among other components, firmware and/or software executed on hardware, it should be noted that such methods, apparatus, and systems are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

Generally, a hematoma located in a human brain is a critical, life threatening condition that requires immediate attention and care. The speed at which a brain hematoma is diagnosed often dictates how effectively the hematoma can be treated. That is, successful treatment of a brain hematoma depends greatly on a rapid identification of the hematoma and the characteristics or extent thereof. However, conventional hematoma screening systems involve manually segmenting potential hematomas on an image obtained via, for example, a non-contrast computed tomography (CT) scan. While potential hematomas may be visible on such an image to a healthcare practitioner or technician, characteristics or an extent of the potential hematoma is currently obtained via the time consuming task of manually segmenting the potential hematoma. Furthermore, the manual segmentation of the potential hematoma is subject to human error that, in such critical situations, can have fatal consequences.

The example methods, apparatus, systems and/or articles of manufacture disclosed herein provide advantages over existing hematoma screening or analysis systems. In particular, the example methods, apparatus, systems, and/or articles of manufacture described herein automatically analyze scan information to calculate data indicative of a location of a hematoma and data indicative of characteristics of the hematoma. Additionally, the example methods, apparatus, systems and/or articles of manufacture described herein automatically integrate the calculated characteristics of the hematoma into image data associated with the scan. The integration of the calculated characteristics described herein enables a display of information indicative of an extent of the hematoma on a presentation of the image data. For example, the characteristics of the hematoma may be displayed in an overlay graphic on the presentation of the image data in response to an input (e.g., a click of a mouse button or a cursor rollover event) received from a user in connection with a region or segment of the image corresponding to the characteristics. Additional aspects, features, and advantages of the example methods, apparatus, systems, and/or articles of manufacture described herein will be apparent from the following disclosure.

In the interest of brevity and clarity, throughout the following disclosure references will be made to an example clinical records server 100. However, the methods, apparatus, systems and/or articles of manufacture described herein may be implemented by and/or within any number and/or type(s) of additional and/or alternative clinical records systems, servers and/or client devices. Such additional and/or alternative systems, servers and/or client devices may be communicatively coupled via any number and/or type(s) of public and/or private networks, and/or may be located and/or implemented at any number and/or type(s) of different geographically locations. Further, any of the methods, apparatus and articles of manufacture described herein could be implemented by or within a clinical records access terminal and/or client device that is communicatively coupled to the example clinical records server 100. Further still, presentations, screens and/or user interfaces generated by an example image analyzer 105, which is described in detail below, may be presented at the clinical records server 100 and/or at a clinic records access terminal and/or client device communicatively coupled to the server 100. Moreover, the example image analyzer 105 may be implemented at any number and/or type(s) of clinical records access terminals and/or client devices communicatively coupled to a clinical records server such as the example clinical records server 100.

FIG. 1 illustrates the example clinical records server 100. To enable a user, such as a healthcare practitioner (e.g., a radiologists, a physician, a surgeon, a technician, an administrator, etc.) to interact with the example clinical records server 100, the clinical records server 100 of FIG. 1 includes an operating system 110, any number and/or type(s) of display(s) and/or output device(s) 115, and any number and/or type(s) of input device(s) 120. The example operating system 110 of FIG. 1 enables information (e.g., clinical records, medical records, test results, images, windows, screens, interfaces, dialog boxes, etc.) to be displayed at the display(s) and/or output device(s) 115, and to allow a user to control, configure and/or operate the example clinical records server 100 via the input device(s) 120. The user provides and/or makes inputs and/or selections via the input device(s) 120. Example input devices 120 include, but are not limited to, a keyboard, a touch screen, a trackball and/or a mouse, a microphone coupled to a voice recognition module, etc.

To manage patient and/or clinical records 125, the example clinical records server 100 of FIG. 1 includes a clinical records manager 130. The example clinical records manager 130 of FIG. 1 enables users via the operating system 110, the input device(s) 120, and/or the display(s) and/or output device(s) 115 to query and/or search for clinical records in the clinical records database 125. The example clinical records manager 130 also enables users via the operating system 110, the input device(s) 120, the display(s) and/or output device(s) 115 to add, create and/or modify clinical records in the database 125. In some examples, clinical records access terminals and/or client devices can access the clinical records database 125 via a clinical records interface or application programming interface 135 and the clinical records manager 130, and via any number and/or type(s) of private and/or public network(s). Patient and/or clinical records may be stored in the example clinical records database 125 using any number and/or type(s) of data structures, entries, tables and/or records. The example clinical records database 125 may be implemented by any number and/or type(s) of memory(-ies), memory device(s) and/or storage device(s).

The example clinical records database 125 may include and/or be in communication with additional record database(s) and may be capable of sharing data among the additional record database(s). For example, the example clinical records database 125 may be implemented as part of an Integrating the Healthcare Enterprise (IHE) Cross-Enterprise Document Sharing (XDS) integration profile, a health information exchange (HIE), a regional health information organization (RHIO), and/or any other system configured to facilitate sharing (e.g., registration, distribution, access, etc.) of healthcare data among the healthcare enterprises. Additionally or alternatively, the example clinical records database 125 may be implemented in a healthcare data system not having information sharing capabilities, such as a standalone physician office, a clinic or a hospital having a central data system.

To analyze healthcare images according to the example methods and apparatus described herein, the example clinical record server 100 of FIG. 1 includes the example image analyzer 105. As described in greater detail below, the example image analyzer 105 receives image data associated with, for example, a non-contrast CT scan of a human brain. The example image analyzer 105 performs a segmentation of the image data to obtain a plurality of blood volume values associated with the brain, as well as corresponding boundaries defining a plurality of segments of the brain. The example image analyzer 105 then integrates the calculated values (e.g., the blood volume values, sizes of the segments, density values, etc.) into the image data by associating the calculated blood volume values with coordinates of the image data. As a result, a first coordinate in a first segment of an image presented using the image data is associated with a set of statistics. The example image analyzer 105 also enables a display of the set of statistics in response to a user input related to the first segment (e.g., by placing a cursor on the first segment of the presentation of the image data and/or clicking a button of a device controlling the cursor, such as a mouse or keypad). As described below, the display may be an overlay on the presentation of the image data including one or more of the statistics associated with the corresponding segment of the image.

Accordingly, the example image analyzer 105 provides a user thereof with automatic, rapid segmentation of image data, as well as an option to view statistics generated in associated with the segmentation by providing a simple input, such as mouse click on an area of interest on a presentation of the image data. In some instances, the image data corresponds to a potential complication, such as a hematoma. In that case, the rapid segmentation of the image data and the ability to obtain statistics from the image data with a single, simple input provided by the example image analyzer 105 impart significant advantages to healthcare practitioners attempting to diagnose and/or analyze a condition of a patient as quickly and as accurately as possible.

Figure 2:
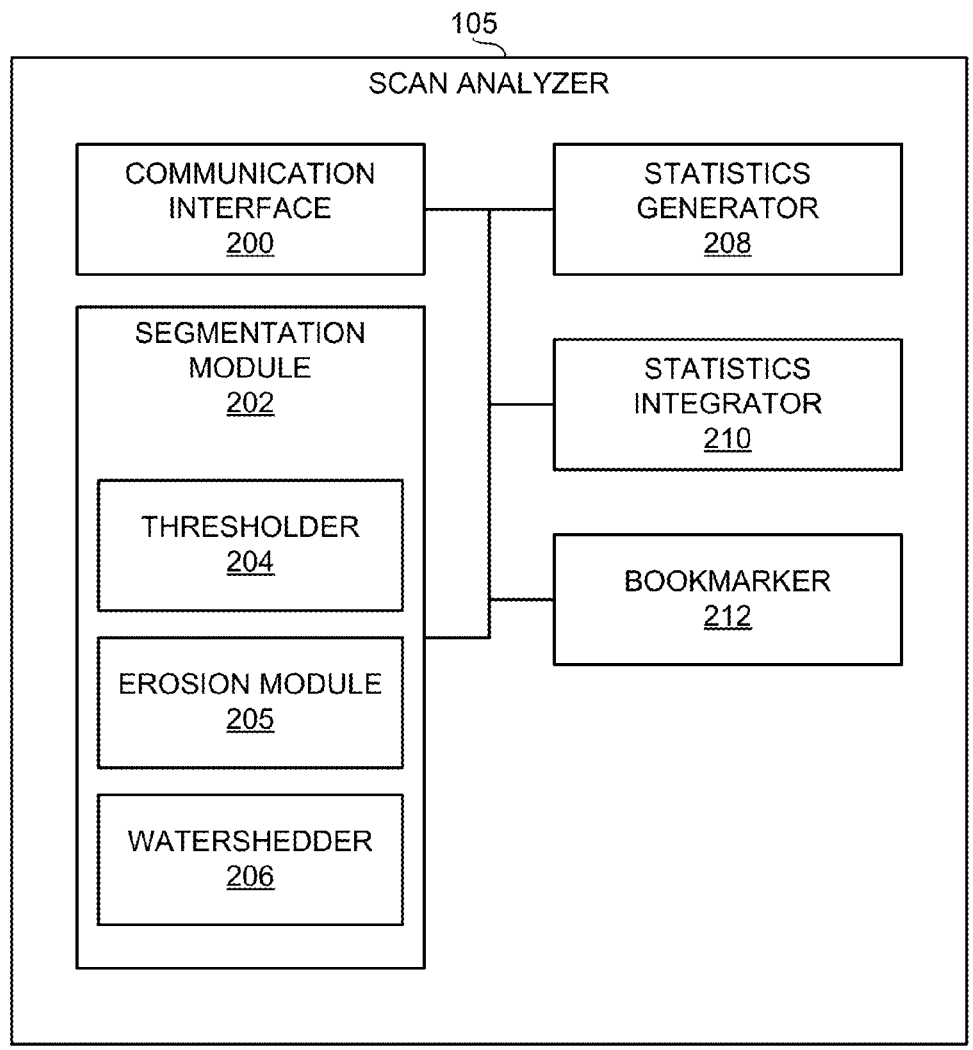
FIG. 2 is a block diagram of an example apparatus that may be used to implement the example scan analyzer of FIG. 1.
Figure 3:
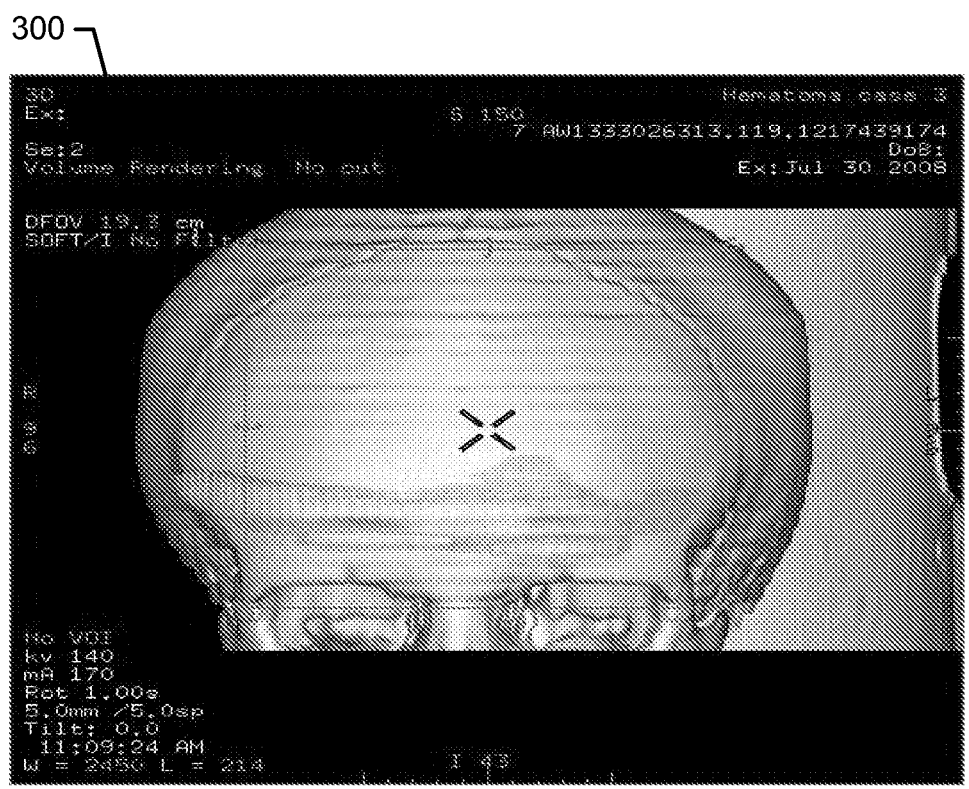
FIG. 3 is a screenshot of an example presentation of image data.

FIG. 2 is a block diagram of an example apparatus that may be used to implement the example image analyzer 105 of FIG. 1. For purposes of illustration, FIG. 2 is described in association with a non-contrast CT scan of a human brain. An example presentation 300 of image data obtained via a non-contrast CT scan of a human brain is shown in FIG. 3. More specifically, the example presentation 300 of FIG. 3 is a volume rendered image of a non-contrast CT scan. However, the example image analyzer 105 may operate on additional or alternative types of images related to additional or alternative anatomical structures. The example image analyzer 105 receives image data generated by the CT scan via a communication interface 200. In the illustrated example, the communication interface 200 may receive the CT scan image data from the example clinical records manager 130 of FIG. 1. For example, a physician using the example clinical records interface 135 of FIG. 1 may instruct the clinical records manager 130 to retrieve the image data of the CT scan from the clinical records database 125 and to convey the same to the example image analyzer 105. The physician may do so as part of diagnosis process and/or to readily obtain automatically generated statistics related to the image data without having to wait for a manual segmentation of the image data. The communication interface 200 may receive the image data from additional or alternative sources.

The example image analyzer 105 of FIG. 2 treats the receipt of the image data at the communication interface 200 as a request to analyze the image data. Accordingly, the communication interface 200 conveys the image data to a segmentation module 202. Generally, the example segmentation module 202 of FIG. 2 is configured to process or transform raw information of the image data so that a representation of the image data is more easily interpreted or analyzed by a user of the representation. In the context of the illustrated example that involves a CT scan of a brain, the example segmentation module 202 is configured to locate blood volumes and to identify boundaries defining segments of blood volumes. In other words, the example segmentation module 202 locates potential hematomas using the received image data. In doing so, the example segmentation 202 also generates a plurality of statistics associated with each of the segments of blood volumes. For example, for each identified segment, the example segmentation module 202 may calculate a blood volume value, a ratio of the blood volume value of the segment to a total blood volume value of all segments or a total blood volume value of the entire brain, size measurements of the segment (e.g., lengths of a major axis and a minor axis), a blood density of the segment, etc.

To calculate these and/or other values, the example segmentation module 202 of FIG. 2 includes a thresholder 204 that implements an example threshold algorithm, an example erosion module 205 that implements an example erosion algorithm, and a watershedder 206 that implements an example watershed algorithm. The example thresholder 204 receives the image data (i.e., output of the CT scan including the full brain volume) and determines which components (e.g., pixels) of the image data correspond to blood. For example, the threshold algorithm may include a predetermined, adjustable threshold value (e.g., brightness or intensity) to be compared to each of the components (e.g., pixels) of the image data. Components that exceed the threshold value are identified as a first type of object and components that do not exceed the threshold value are identified as a second type of object. In the illustrated example, the threshold algorithm identifies blood and non-blood objects and generates first and second sets therefor. In some examples, the threshold algorithm also calculates blood volume values associated with each blood object is calculated from, for example, intensities associated with the objects. Alternatively, the blood volume values are part of the image data received at the communication interface 200 of the example image analyzer 105.

The example threshold algorithm may also be configured to identify components having a certain intensity value associated with blood. In such instances, the threshold value of the threshold algorithm can be set such that the threshold algorithm identifies blood objects of a first value or intensity and blood objects of a second value or intensity lower than the first value or intensity. Additionally, the threshold algorithm may be configured to identify more than two types of objects to generate tiers of results. That is, the thresholder 204 may identify components of the image data at three or more levels using two or more threshold values.

The example segmentation module 202 conveys the results of the example threshold algorithm to the example erosion module 205. The example erosion algorithm recognizes that the blood results generated by the threshold algorithm may include non-hematoma blood indications connected to hematoma blood indications. To remedy this, the example erosion algorithm disconnects the non-hematoma blood indications from the hematoma blood indications. In other words, the example erosion algorithm isolates the hematoma blood indications for additional analysis.

The example segmentation module 202 conveys the results of the example erosion algorithm to the example watershedder 206. Generally, the example watershed algorithm identifies a plurality of segments in the image data corresponding to the blood volume values calculated by the example threshold algorithm and/or as received from the image data from the CT scan. To identify the segments, the example watershed algorithm partitions pieces of data into clusters defined by boundaries identified by the watershed algorithm. For example, the watershed algorithm may include a K-mean clustering approach that groups pieces of data (e.g., blood volume values) into sets. In the illustrated example, the sets correspond to segments of the image generated by the CT scan defined by boundaries across the image of the brain. As a result, the example segmentation module 202 generates a plurality of segments in the brain that represent clusters of blood found via the CT scan.

In the example image analyzer 105 of FIG. 2, the data corresponding to these clusters generated by the example watershedder 206 is conveyed to a statistics generator 208. The example statistics generator 208 calculates a plurality of statistics related to the segments of the brain. In the illustrated example, the statistics generator 208 calculates a blood volume value in a certain unit of measurement (e.g., milliliters) for each of the segments, a first length of each segment corresponding to a short axis of the respective segment, a second length of each segment corresponding to a long axis of the respective segment, a minimum blood density (e.g., in Hounsfield units) for each segment, and a maximum blood density (e.g., in Hounsfield units) for each segment. The example statistics generator 208 may calculate additional or alternative statistics, measurements, and/or values of interest to a healthcare practitioner viewing a presentation of the image data.

These statistics are then integrated into the image data using a statistics integrator 210. To integrate the statistics into the image data, the example statistics integrator 210 of FIG. 2 associates the statistics for each segment or area with the coordinate values corresponding to the location of each segment. Each segment includes a plurality of coordinate values, such as X-axis and Y-axis values in a standard coordinate map, that are each configured to represent a location on a presentation of the image data. The statistics integrator 210 associates the statistics with the coordinates in a manner such that an input received from a user related to a first one of the coordinate values, such as click of button of a device controlling a cursor placed in a location corresponding to the first coordinate value, triggers an output including the statistics integrated with the first coordinate value. In other words, the example statistics integrator 210 appends the statistics to the image data such that a presentation device displaying the image data (e.g., one or more of the display(s) and/or output device(s) 115 of FIG. 1) has immediate access to the statistics associated with each coordinate of the displayed image. For example, each of the coordinates in a certain segment of the brain can be tagged with the statistics generated by the statistics generator 208. The tags are generated by the statistics integrator 210 such that the tags are indexed in association with the coordinates. Thus, when a presentation device receives an input related to a first coordinate, the first coordinate is checked against a data structure including the tags. When the first coordinate is associated with a tag having one or more statistics, the presentation device can display the statistics to a user thereof. The example statistics integrator 210 of FIG. 2 may append the statistics to the image data in additional or alternative ways such that the statistics information integrated into the image data can be interpreted by a presentation device in response to an input related to a corresponding coordinate.

Figure 4:
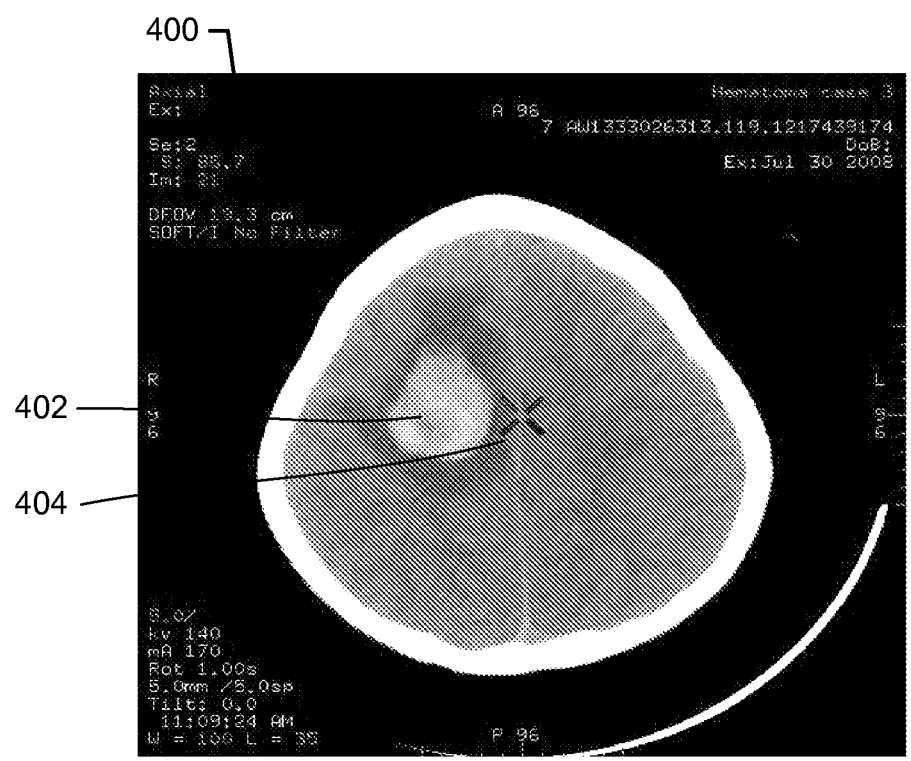
FIG. 4 is a screenshot of an example presentation of image data.
Figure 5:
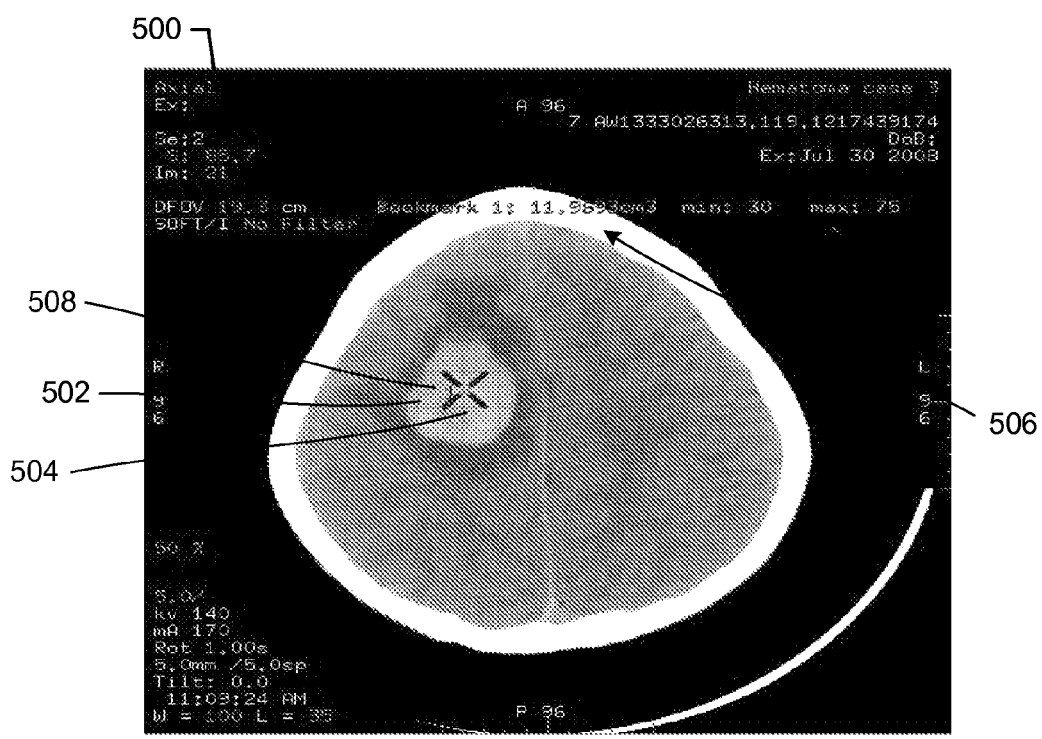
FIG. 5 is a screenshot of an example presentation of image data.

The components of the image data corresponding to the statistics can be output by any suitable presentation device in any suitable manner. FIG. 4 shows an example presentation 400 of the image data of the CT scan received by the example image analyzer 105. More specifically, the example presentation 400 is an axial view of the non-contrast CT image including an intracerebral hematoma 402. In the example of FIG. 4, a cursor 404 is not located on a coordinate corresponding to the hematoma 402. However, FIG. 5 shows an example presentation 500 of the image data of the CT scan including a hematoma 502 on which a cursor 504 is located. That is, a user has placed the cursor 504 on a coordinate that is part of a segment of the hematoma 502. As described above, the statistics associated with this coordinate are displayed to the user in response to the placement of the cursor 504 shown in FIG. 5 and/or a click of a button of a device controlling the cursor 504. In the illustrated example of FIG. 5, the statistics are presented on the presentation 500 as an overlay 506. As shown in FIG. 5, the displayed statistics of the overlay 506 include a blood volume in cubic centimeters associated with the selected segment, a minimum density associated with the selected segment, and a maximum density associated with the segment. As described above, additional or alternative statistics can be associated with the segment and/or displayed in response to a user input.

Figure 6:
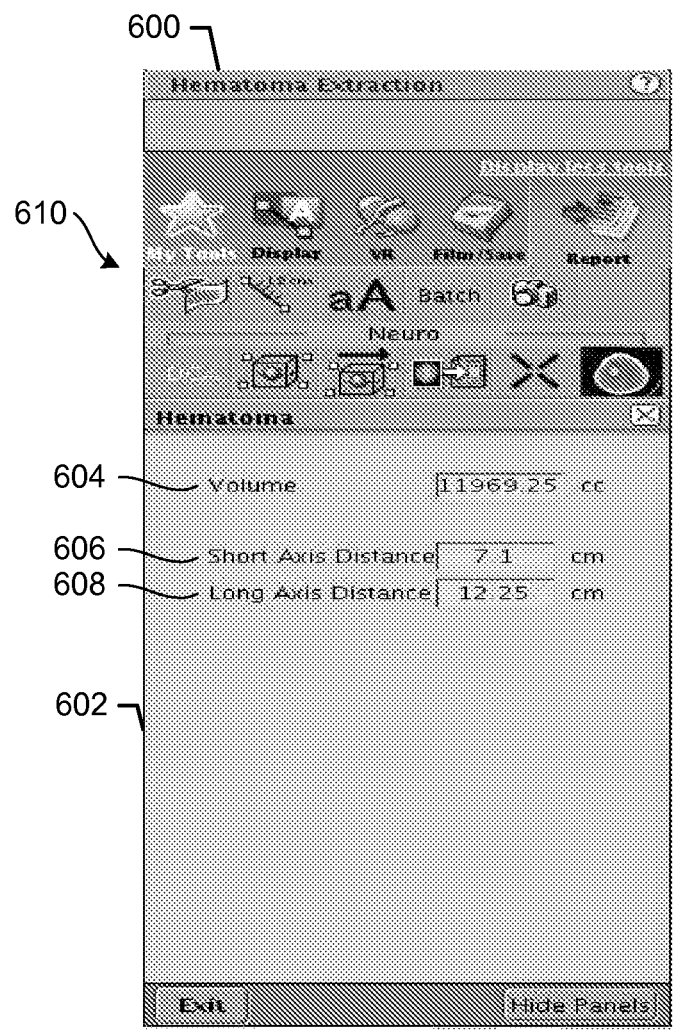
FIG. 6 is a screenshot of an example presentation of an example window.

FIG. 6 shows another example presentation 600 of the statistics associated with a selected coordinate of the image data. The example presentation 600 includes a panel window 602 that displays a blood volume associated with the selected coordinate 604, a short axis distance or length 606 associated with the segment including the selected coordinate, and a long axis distance or length 608 associated with the segment including the selected coordinate. The example panel window 602 can be displayed in addition to or in lieu of the example overlay 506 of FIG. 5. In the illustrated examples, the panel window 602 of FIG. 6 is displayed in addition to the example overlay 506 of FIG. 5 as the example panel window 602 provides additional information to the information presented in the example overlay 502. The example panel window 602 of FIG. 6 also include a plurality of options or tools 610 selectable by the user for use in connection with the image data.

The example image analyzer 105 of FIG. 2 also includes a bookmarker 212. The example bookmarker 212 receives an input from, for example, one of the display(s) and/or output device(s) 115 of FIG. 1 related to a coordinate of the image data. In response, the example bookmarker 212 designates the selected coordinate as a bookmarked coordinate. For example, the bookmarker 212 may set a flag associated with the coordinate to indicate that the coordinate was bookmarked by a user of the image data. In the illustrated example, bookmarked coordinates instruct a presentation device processing the image data to highlight the bookmarked coordinates such that a user of the presentation device can readily return to the bookmarked coordinate and, accordingly, be presented with the statistics associated therewith. While the example bookmarker 212 is shown as implemented in the example image analyzer 105 of FIG. 2, the bookmarker 212 may be implemented in or in association with additional or alternative components such as, for example, one or more of the display(s) and/or output device(s) 115 of FIG. 1.

Referring back to FIG. 5, a bookmark 508 is placed on the presentation 500 of the image data at the location on which the cursor 504 is placed. Accordingly, the example bookmarker 212 designates the corresponding coordinate as bookmark '1' and the coordinate can be returned to at a later time. As indicated in the overlay 506, the bookmark is associated with the statistics integrated into the selected coordinate.

Figure 7:
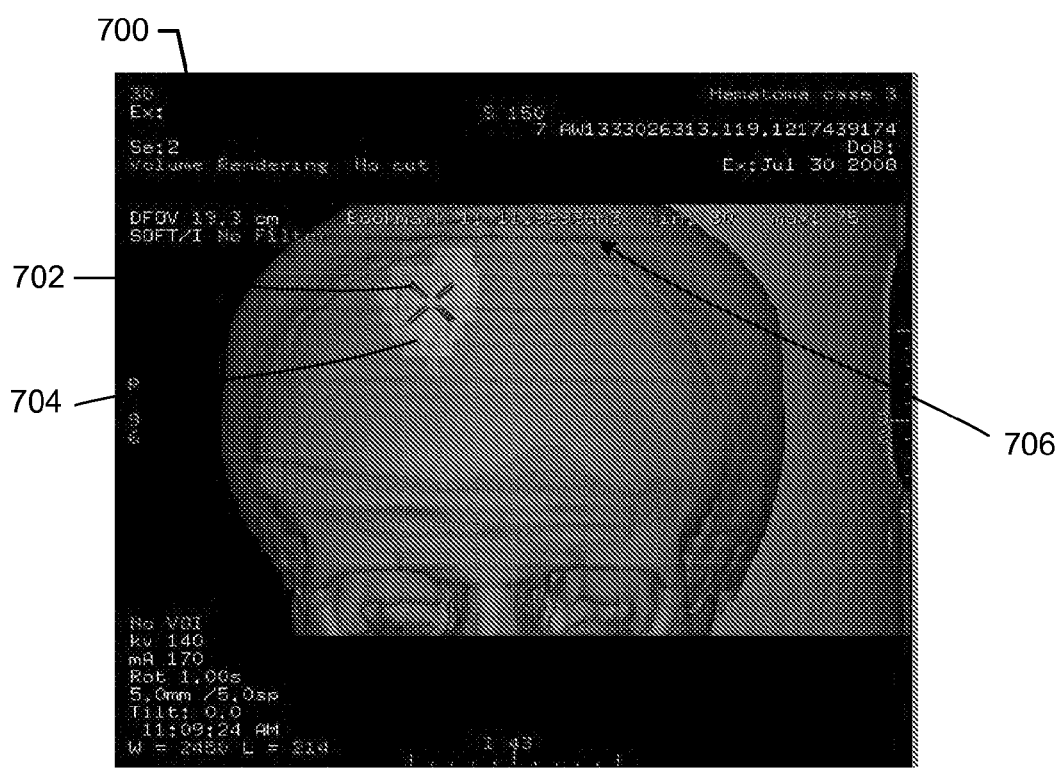
FIG. 7 is a screenshot of an example presentation of image data.

FIG. 7 is a presentation 700 of a volume rendered view of the image data including the integrated statistics as described above. Similar to the other views of the image data, a cursor 702 can be placed on a segment of a hematoma 704 and the statistics associated with the corresponding coordinate are displayed in an overlay 706 in response to a click of a button of a device controlling the cursor 702.

While an example manner of implementing the image analyzer 105 of FIG. 1 has been illustrated in FIG. 2, one or more of the elements, processes and/or devices illustrated in FIG. 2 may be combined, divided, re-arranged, omitted, eliminated and/or implemented in any other way. Further, the example communication interface 200, the example segmentation module 202, the example thresholder 204, the example erosion module 205, the example watershedder 206, the example statistics generator 208, the example statistics integrator 210, and the example bookmarker 212, and/or, more generally, the example image analyzer 105 of FIG. 2 may be implemented by hardware, software, firmware and/or any combination of hardware, software and/or firmware. Thus, for example, any of the example communication interface 200, the example segmentation module 202, the example thresholder 204, the example erosion module 205, the example watershedder 206, the example statistics generator 208, the example statistics integrator 210, and the example bookmarker 212, and/or, more generally, the example image analyzer 105 of FIG. 2 can be implemented by one or more circuit(s), programmable processor(s), application specific integrated circuit(s)

(ASIC(s)), programmable logic device(s) (PLD(s)) and/or field programmable logic device(s) (FPLD(s)), etc. When any of the appended claims are read to cover a purely software and/or firmware implementation, at least one of the example communication interface 200, the example segmentation module 202, the example thresholder 204, the example erosion module 205, the example watershedder 206, the example statistics generator 208, the example statistics integrator 210, and the example bookmarker 212, and/or, more generally, the example image analyzer 105 of FIG. 2 are hereby expressly defined to include a tangible medium such as a memory, DVD, CD, etc., storing the software and/or firmware. Further still, the example image analyzer 105 of FIG. 2 may include one or more elements, processes and/or devices in addition to, or instead of, those illustrated in FIG. 2, and/or may include more than one of any or all of the illustrated elements, processes and devices.

Figure 8:
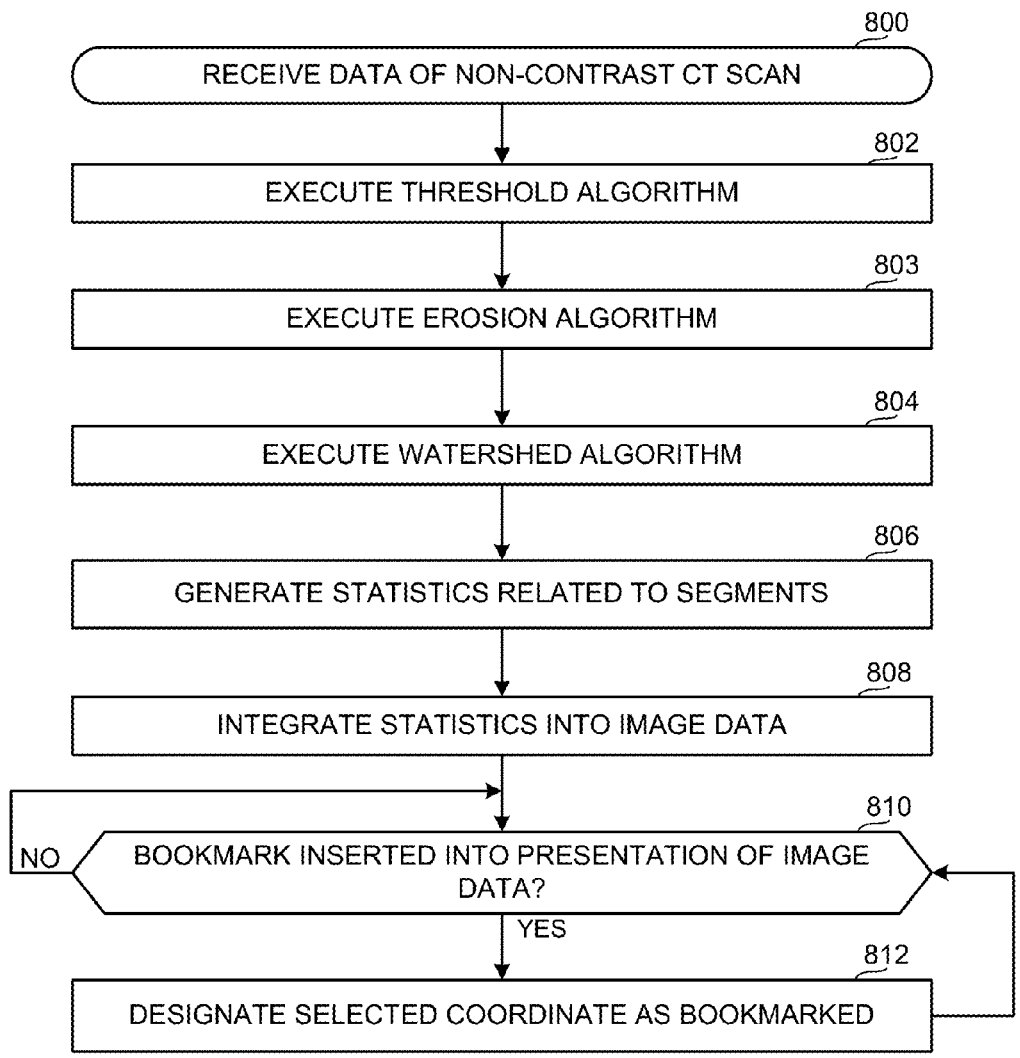
FIG. 8 is a flow diagram representative of example machine readable instructions that may be executed to implement the example scan analyzer of FIGS. 1 and/or 2.

FIG. 8 is a flow diagram representative of example machine readable instructions that may be executed to implement the example image analyzer 105 of FIGS. 1 and/or 2. The example processes of FIG. 8 may be performed using a processor, a controller and/or any other suitable processing device. For example, the example processes of FIG. 8 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIG. 8 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 8 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 8 may be implemented manually or as any combination(s) of any of the foregoing techniques, for example, any combination of firmware, software, discrete logic and/or hardware. Further, although the example processes of FIG. 8 are described with reference to the flow diagrams of FIG. 8, other methods of implementing the processes of FIG. 8 may be employed. For example, the order of execution of the blocks may be changed, and/or some of the blocks described may be changed, eliminated, sub-divided, or combined. Additionally, any or all of the example processes of FIG. 8 may be performed sequentially and/or in parallel by, for example, separate processing threads, processors, devices, discrete logic, circuits, etc.

The example flow diagram of FIG. 8 begins with the example image analyzer 105 receiving image data associated with a non-contrast CT scan of a human brain via the communication interface 200 (block 800). The received image data includes a full brain volume obtained via the CT scan, as well as a plurality of values associated with a plurality of components (e.g. pixels) of the scan. The communication interface 200 conveys the image data to the segmentation module 202, which executes a threshold algorithm via the thresholder 204 (block 802). Generally, the threshold algorithm identifies or locates blood in the image data. That is, the threshold algorithm isolates components of the image generated by the CT scan that correlate to blood in the brain. The results of the threshold algorithm are conveyed to the erosion module 205, which isolates hematoma blood results from non-hematoma blood results (block 803). The output of the erosion algorithm is conveyed to the watershedder 206 of the segmentation module 202, which executes a watershed algorithm thereon (block 804). The watershed algorithm identifies a plurality of boundaries in the image using the blood volume values and, as a result, generates a plurality of segments within the image data.

The example statistics generator 208 analyzes the segments provided by the segmentation module 202 to generate one or more statistics related to each of the segments (block 806). Example statistics to be generated by the statistics generator 208 include calculates a blood volume value in a certain unit of measurement (e.g., milliliters) for each of the segments, a first length of each segment corresponding to a short axis of the respective segment, a second length of each segment corresponding to a long axis of the respective segment, a minimum blood density (e.g., in Hounsfield units) for each segment, and a maximum blood density (e.g., in Hounsfield units) for each segment.

The statistics are then integrated into the image data by the statistics integrator 210 (block 808). This integration of the statistics is performed such that the statistics can be readily retrieved by a presentation device in response to an input related to one of the segments. That is, the integration of the statistics into the image data enables a display of the statistics in connection with (e.g., via an overlay or a panel window) a presentation of the image data in response to a single input received from a user, such as a cursor being placed on a coordinate of the image corresponding to a hematoma (as shown in FIGS. 4, 5 and 7).

A user utilizing a presentation of the image data may insert a bookmark into the image data using a cursor. For example, when a cursor is placed on a coordinate of an image and/or when a button associated with the cursor is engaged, thereby yielding a display of statistics of the statistics that the user deems interesting or worth revisiting (e.g., to show an attending physician, a surgeon, or other team member), the user may bookmark the coordinate. In such instances (block 810), the bookmarker 212 designates the selected coordinate as a bookmark in the image data so that the statistics and location of the selected coordinate can be readily obtained at a later time.

Figure 9:
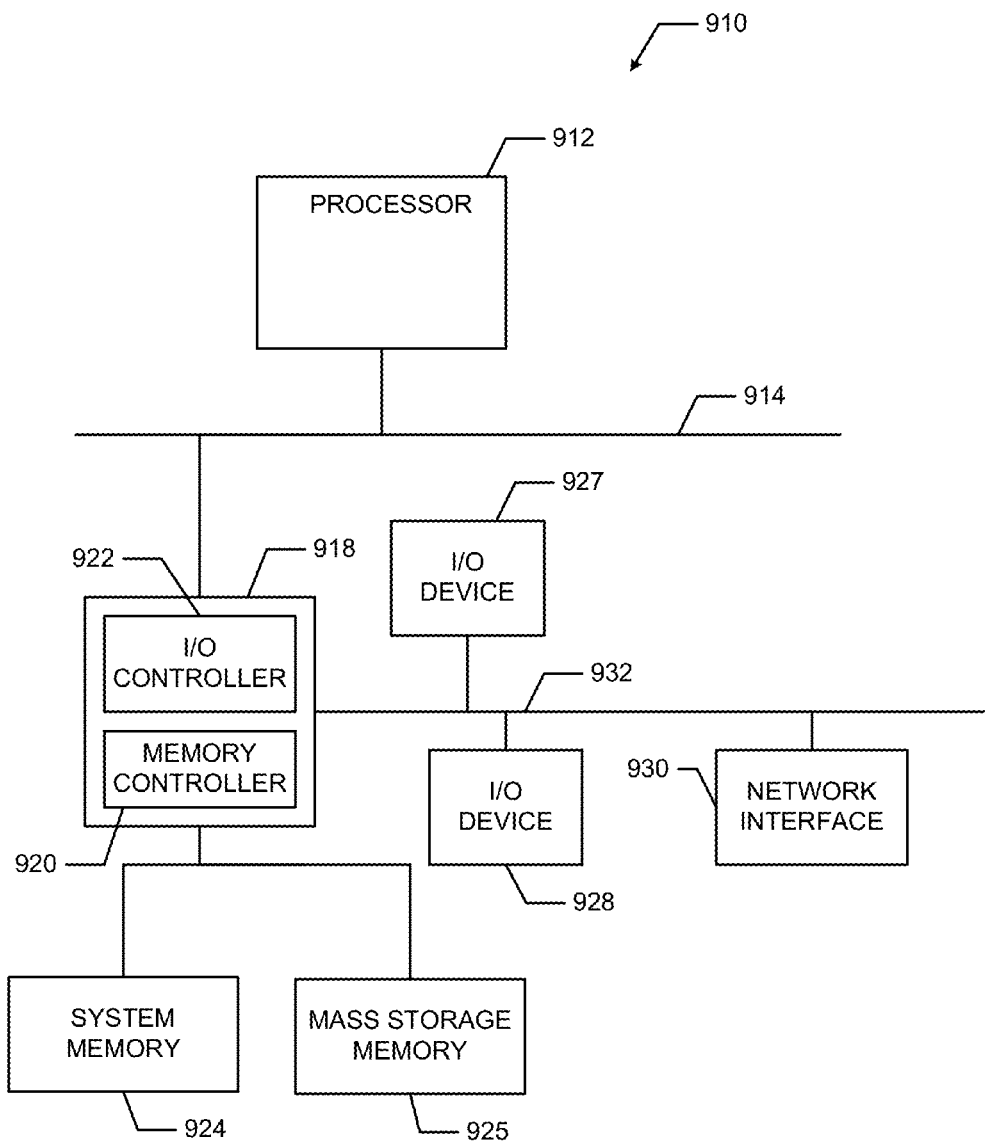
FIG. 9 is a block diagram of an example processor system that may be used to execute the machine readable instructions of FIG. 3 and/or to implement the example image analyzer of FIGS. 1 and/or 2.

FIG. 9 is a block diagram of an example processor system 910 that may be used to implement the apparatus and methods described herein. As shown in FIG. 9, the processor system 910 includes a processor 912 that is coupled to an interconnection bus 914. The processor 912 may be any suitable processor, processing unit or microprocessor. Although not shown in FIG. 9, the system 910 may be a multi-processor system and, thus, may include one or more additional processors that are identical or similar to the processor 912 and that are communicatively coupled to the interconnection bus 914.

The processor 912 of FIG. 9 is coupled to a chipset 918, which includes a memory controller 920 and an input/output (I/O) controller 922. As is well known, a chipset typically provides I/O and memory management functions as well as a plurality of general purpose and/or special purpose registers, timers, etc. that are accessible or used by one or more processors coupled to the chipset 918. The memory controller 920 performs functions that enable the processor 912 (or processors if there are multiple processors) to access a system memory 924 and a mass storage memory 925.

The system memory 924 may include any desired type of volatile and/or non-volatile memory such as, for example, static random access memory (SRAM), dynamic random access memory (DRAM), flash memory, read-only memory (ROM), etc. The mass storage memory 925 may include any desired type of mass storage device including hard disk drives, optical drives, tape storage devices, etc.

The I/O controller 922 performs functions that enable the processor 912 to communicate with peripheral input/output (I/O) devices 926 and 928 and a network interface 930 via an I/O bus 932. The I/O devices 926 and 928 may be any desired type of I/O device such as, for example, a keyboard, a video display or monitor, a mouse, etc. The network interface 930 may be, for example, an Ethernet device, an asynchronous transfer mode (ATM) device, an 802.11 device, a DSL modem, a cable modem, a cellular modem, etc. that enables the processor system 910 to communicate with another processor system.

While the memory controller 920 and the I/O controller 922 are depicted in FIG. 9 as separate blocks within the chipset 918, the functions performed by these blocks may be integrated within a single semiconductor circuit or may be implemented using two or more separate integrated circuits.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

Certain embodiments include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A computer-implemented method for identifying a hematoma using a scan, the method comprising:
    performing a threshold procedure and a watershed procedure on data obtained via a scan of a brain to generate a plurality of segments based on blood volumes associated with the segments;
    generating one or more statistics related to the each of the segments; and
    integrating the statistics into image data associated with the scan such that a first one of the statistics corresponding a first one of the segments is to be displayed to a user of the image data in response to receiving an input from the user in connection with the first one of the segments.

2. A method as defined in claim 1, wherein the input comprises an event associated with a cursor at a coordinate corresponding to the first one of the segments.

3. A method as defined in claim 1, wherein the first one of the statistics comprises at least one of a ratio of blood volume in the first one of the segments to a sum total of blood volumes in all of the segments, a blood volume of the first segment, a blood density of the segment, or a distance associated with the segment.

4. A method as defined in claim 1, wherein displaying the first one of the statistics comprises presenting an overlay on a presentation of the image data.

5. A method as defined in claim 1, wherein integrating the statistics into the image data comprises assigning each of the statistics to one of a plurality of coordinates associated with the image data.

6. A method as defined in claim 1, wherein the scan comprises a non-contrast computed tomography scan.

7. A method as defined in claim 1, further comprising enabling the user to create a bookmark corresponding to the received input.

8. An tangible computer readable medium having instructions stored thereon that, when executed cause a machine to at least:
    perform a threshold procedure and a watershed procedure on data obtained via a scan of a brain to generate a plurality of segments based on blood volumes associated with the segments;
    generate one or more statistics related to the each of the segments; and integrate the statistics into image data associated with the scan such that a first one of the statistics corresponding a first one of the segments is to be displayed to a user of the image data in response to receiving an input from the user in connection with the first one of the segments.

9. A tangible machine readable medium as defined in claim 8, wherein the input comprises an event associated with a cursor located at a coordinate corresponding to the first one of the segments.

10. A tangible machine readable medium as defined in claim 8, wherein the first one of the statistics comprises at least one of a ratio of blood volume in the first one of the segments to a sum total of blood volumes in all of the segments, a blood volume of the first segment, a blood density of the segment, or a distance associated with the segment.

11. A tangible machine readable medium as defined in claim 8, wherein integrating the blood volume values into the image data comprises assigning each of the statistics to one of a plurality of coordinates associated with the image data.

12. A tangible machine readable medium as defined in claim 8, wherein displaying the first one of the statistics comprises presenting an overlay on a presentation of the image data.

13. A tangible machine readable medium as defined in claim 8, wherein the scan comprises a non-contrast computed tomography scan.

14. A tangible machine readable medium as defined in claim 8 having instructions stored thereon that, when executed, cause a machine to enable the user to create a bookmark corresponding to the received input.

15. An apparatus to analyze a healthcare image, comprising:
   an image segmentation module to partition image data associated with a healthcare image into a plurality of segments based on a plurality of blood volume values; and
   an integrator to associate a plurality of statistic sets related to the blood volume values with each of the segments in the image data such that a first one of the statistic sets is to be displayed as an overlay on a presentation of the healthcare image in response to detecting an event associated with a cursor located at a first one of the segments corresponding to the first statistic set.

16. An apparatus as defined in claim 15, wherein the image segmentation module is to execute a threshold algorithm and a watershed algorithm.

17. An apparatus as defined in claim 16, the threshold algorithm to identify blood results using the image data and the watershed algorithm to generate the plurality of segments using the blood results identified via the threshold algorithm.

18. An apparatus as defined in claim 15, each of the statistic sets including a respective blood volume value, a short axis distance, a long axis distance, a minimum blood density, and a maximum density.

19. An apparatus as defined in claim 15, wherein the image data is obtained via a non-contrast computed tomography scan.

20. An apparatus as defined in claim 15, further comprising a bookmarker designate one or more coordinates of the image data as bookmarked by a user, wherein bookmarks correspond to one of the segments on which the cursor was located.

* * * * *